United States Patent
Lykke et al.

(10) Patent No.: US 10,829,376 B2
(45) Date of Patent: Nov. 10, 2020

(54) PROCESS FOR PRODUCTION OF SULFURIC ACID

(71) Applicant: HALDOR TOPSØE A/S, Kgs. Lyngby (DK)

(72) Inventors: Mads Lykke, Brønshøj (DK); Rasmus Sverdrup, Malmö (SE); Morten Thellefsen, Hillerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 15/572,297

(22) PCT Filed: Jun. 29, 2016

(86) PCT No.: PCT/EP2016/065119
§ 371 (c)(1),
(2) Date: Nov. 7, 2017

(87) PCT Pub. No.: WO2017/001463
PCT Pub. Date: Jan. 5, 2017

(65) Prior Publication Data
US 2018/0127271 A1 May 10, 2018

(30) Foreign Application Priority Data
Jul. 2, 2015 (DK) .................. 2015 00377

(51) Int. Cl.
*C01B 17/76* (2006.01)
*B01D 53/86* (2006.01)
(Continued)

(52) U.S. Cl.
CPC ........ *C01B 17/765* (2013.01); *B01D 53/8609* (2013.01); *C01B 17/54* (2013.01);
(Continued)

(58) Field of Classification Search
None
See application file for complete search history.

(56) References Cited

U.S. PATENT DOCUMENTS

| 3,350,169 A | 10/1967 | Rinckhoff |
| 3,536,446 A | 10/1970 | Maurer |

(Continued)

FOREIGN PATENT DOCUMENTS

| CN | 202208638 | * | 8/2011 |
| CN | 102344125 | * | 2/2012 |

(Continued)

OTHER PUBLICATIONS

International Search Report (PCT/ISA/210) dated Oct. 31, 2016, by the European Patent Office as the International Searching Authority for International Application No. PCT/EP2016/065119.

(Continued)

*Primary Examiner* — Sheng H Davis
(74) *Attorney, Agent, or Firm* — Buchanan Ingersoll & Rooney P.C.

(57) ABSTRACT

A process plant for production of sulfuric acid from a process gas comprising SO2, including a process gas inlet, a first SO2 converter having an inlet and an outlet, a first condenser having a gas inlet, a gas outlet and a liquid outlet, a gas mixing device having a first inlet, a second inlet and an outlet, a process gas heater having an inlet and an outlet, a second SO2 converter having an inlet and an outlet, a second condenser having a gas inlet, a gas outlet and a liquid outlet, one or more means for cooling and storage of sulfuric acid and a purified process gas outlet.

8 Claims, 4 Drawing Sheets

(51) Int. Cl.
*C01B 17/80* (2006.01)
*C01B 17/765* (2006.01)
*C01B 17/79* (2006.01)
*C01B 17/54* (2006.01)
*C01B 17/78* (2006.01)

(52) U.S. Cl.
CPC .......... *C01B 17/7655* (2013.01); *C01B 17/78* (2013.01); *C01B 17/79* (2013.01)

(56) References Cited

U.S. PATENT DOCUMENTS

| | | | |
|---|---|---|---|
| 3,780,166 A * | 12/1973 | Drechsel et al. | C01B 17/7655 423/522 |
| 3,907,979 A * | 9/1975 | Jenniges | C01B 17/7655 423/522 |
| 4,678,028 A * | 7/1987 | Conant | F28B 1/02 165/110 |
| 2007/0110663 A1* | 5/2007 | Christensen | C01B 17/7655 423/522 |
| 2010/0092374 A1 | 4/2010 | Erkes et al. | |
| 2010/0254889 A1 | 10/2010 | Bogenstätter et al. | |
| 2013/0000869 A1* | 1/2013 | Daum | C01B 17/7655 165/104.25 |
| 2014/0048228 A1 | 2/2014 | Hansen et al. | |
| 2014/0219910 A1 | 8/2014 | Lykke | |
| 2015/0315022 A1 | 11/2015 | Perez | |

FOREIGN PATENT DOCUMENTS

| | | | |
|---|---|---|---|
| CN | 202208638 | * | 5/2012 |
| CN | 204034592 | * | 12/2014 |
| SU | 1273726 | * | 7/1985 |
| WO | WO 2008/052649 A1 | | 5/2008 |
| WO | WO 2009/060022 A1 | | 5/2009 |
| WO | WO 2012/136307 A1 | | 10/2012 |
| WO | 2013044937 | * | 4/2013 |
| WO | WO 2013/044937 A1 | | 4/2013 |
| WO | WO 2014/094146 A1 | | 6/2014 |

OTHER PUBLICATIONS

Written Opinion (PCT/ISA/237) dated Oct. 31, 2016, by the European Patent Office as the International Searching Authority for International Application No. PCT/EP2016/065119.

Danish Office Action dated Oct. 2, 2015, issued by the Danish patent and Trademark Office in corresponding Danish Patent Application No. PA 2015 00377. (4 pages).

\* cited by examiner

PROCESS FOR PRODUCTION OF SULFURIC ACID

Concentrated sulfuric acid ($H_2SO_4$) is a very common chemical, used in several industries for e.g. fertilizer production, alkylation, metal ore leaching and production of titanium dioxide, paper and rubber.

The majority of the feedstock for the sulfuric acid production is elemental sulfur from desulfurization of oil and gas, but also $H_2S$ gas withdrawn directly from the desulfurization process is widely used. $SO_2$ released during metal smelting processes is also an important feedstock.

The processes for converting the sulfur based feedstock into sulfuric acid are numerous, but most of them share the same basic layout: transformation of the sulfur based feedstock into a gas comprising $SO_2$, catalytic oxidation of $SO_2$ to $SO_3$ and either absorption of $SO_3$ into a $H_2SO_4$ solution or condensation of $H_2SO_4$ to withdraw the desired sulfuric acid product.

Depending on the feedstock composition and local environmental legislation, the desired $SO_2$ conversion efficiency dictates the process layout. For high $SO_2$ concentrations and high $SO_2$ conversion efficiencies, the most common process layout for the sulfuric acid plant is of the so-called double conversion type: a first $SO_2$ oxidation and first sulfuric acid withdrawal followed by a second final $SO_2$ oxidation and second final withdrawal of sulfuric acid. The first withdrawal of the product ensures favorable $SO_2$ conversion thermodynamics in the second $SO_2$ oxidation step and with such layout overall $SO_2$ conversion efficiency above 99.95% is achievable.

The present disclosure describes such a sulfuric acid plant layout for treatment of different sulfur containing feedstocks, having a simpler layout and higher heat recovery than the prior art. Specifically, the present disclosure describes an improvement in the layout of the first sulfuric acid condensation step and first process gas reheating step, providing a simpler layout requiring less heat exchange area, reduced operating cost and more robust operation of the sulfuric acid plant.

Definitions

As used herein sulfuric acid plant shall be understood as the process equipment and the process comprising an inlet of feed gas, catalytic conversion of $SO_2$ to $SO_3$ and hydration of $SO_3$ to form sulfuric acid, as well as the related supporting processes including valves, pumps, heat exchangers etc.

As used herein, a catalytically active material may be catalyst in any form and shape, including but not limited to catalyst pellets, extruded catalyst, monolithic catalyst and surfaces coated with catalytically active material. The catalytically active material may comprise any substance known in the art to catalyse the oxidation of $SO_2$ to $SO_3$, including but not limited to the following active substances alkali-vanadium, platinum, cesium, ruthenium oxide, and activated carbon.

Throughout the present text, trivial but critical elements such as pumps, valves and heat exchangers may not be mentioned explicitly, but such an omission shall not be construed as an absence of the elements, unless explicitly mentioned as such.

Throughout the application chemical compounds may be referred to by chemical formulae, chemical names or trivial names. These shall be understood as fully synonymous, and no special meaning shall be conferred from differences in this terminology.

Where a term such as immediately upstream or immediately downstream is used it confers that only insignificant process steps or elements exists in between the two process steps or elements discussed.

In the following the unit $Nm^3$ shall be understood as "normal" $m^3$, i.e. the amount of gas taken up this volume at 0° C. and 1 atmosphere.

The dew point for a component of a gas (such as the sulfuric acid dew point), is the temperature and pressure at which the component (sulfuric acid) starts condensing from the gas phase.

In general chemical reactions may be described by any of the terms conversion, decomposition, reaction or oxidation, without any specific understanding shall be taken from that, unless specifically stated.

Where concentrations (%) in the gas phase are given, they are, unless otherwise specified given as molar concentration.

As used herein, concentrations of sulfur trioxide in gas form are stated as mole % under the assumption that all hexavalent sulfur is present as sulfur trioxide, and therefore it includes sulfur trioxide as well as sulfur trioxide hydrated to gaseous sulphuric acid.

Similarly if water concentrations are stated as "unhydrated" it is assumed that no water is bound in sulfuric acid.

The term fluid communication shall be construed as any substantially unhindered connection between two process elements, including but not limited to the connection via pipes and ducts, via the same side of heat exchangers, but excluding the connection through a catalyst filled reactor.

The term thermal communication shall be construed as any substantially unhindered thermal connection between two process elements, including but not limited to the connection via heat exchanger either with the two media in thermal communication being present on separate sides in the same heat exchanger or by a thermal connection via a heat exchange medium.

A broad aspect of the present invention relates to a process plant for production of sulfuric acid from a process gas comprising $SO_2$, comprising a process gas inlet, a first $SO_2$ converter having an inlet and an outlet, a first condenser having a gas inlet, a gas outlet and a liquid outlet, a gas mixing device having a first inlet, a second inlet and an outlet, a process gas heater having an inlet and an outlet, a second $SO_2$ converter having an inlet and an outlet, a second condenser having a gas inlet, a gas outlet and a liquid outlet, one or more means for cooling and storage of sulfuric acid and a purified process gas outlet, in which said process gas inlet is in fluid communication with the inlet of the first $SO_2$ converter, the outlet of the first $SO_2$ converter is in fluid communication with the gas inlet of the first condenser, the liquid outlet of the first condenser is in fluid communication with one of said means for cooling and storage of sulfuric acid, the gas outlet of said first condenser is in fluid communication with the first inlet of a mixing device, the outlet of said mixing device is in fluid communication with the inlet of the process gas heater, the outlet of said process gas heater is in fluid connection with the inlet to said second $SO_2$ converter and the second inlet of said gas mixing device, the outlet of the second $SO_2$ converter is in fluid communication with the gas inlet of the second condenser, the liquid outlet of the second condenser is in fluid communication with one of said means for storage of sulfuric acid, the gas outlet of said second condenser is in fluid communication with the purified process gas outlet,
characterized in the first inlet of said gas mixing device being in fluid communication with the outlet of said first condenser, without intermediate heat exchange.
with the associated benefit of such a process plant being energy efficient and having a reduced need for corrosion resistant materials, compared to a process plant having heating of the gas leaving the first condenser.

In a further embodiment said mixing device comprises one or more elements for enhancing mixing, such as impingement plates or packing elements
with the associated benefit of such a mixing device of increased mixing of cold partially desulfurized gas and recycled hot process gas, and thus reduced risk of condensation of corrosive sulfuric acid.

In a further embodiment one or both of said first and second condenser comprises a cooling medium enclosure, having a cooling medium inlet and a cooling medium outlet. with the associated benefit of such a condenser of having improved control of condensation temperature.

In a further embodiment said cooling medium enclosure is a pressure shell, and in which said condenser comprises a number of tubes made from corrosion resistant material, with the associated benefit of such a condenser being compact.

In a further embodiment said cooling medium enclosure comprises a number of tubes made from corrosion resistant materials and in which said condenser comprises a shell made from corrosion resistant materials, allowing corrosive process gas on the shell side of the tubes.

In a further embodiment the process plant comprises a second process gas heater having an inlet and outlet in which said inlet of the second process gas heater is in fluid communication with the outlet of the first process gas heater and the outlet of the second process gas heater is in fluid communication with the second $SO_2$ converter, and in which at least one of the first and second process gas heater is in thermal communication with the outlet of the second $SO_2$ converter with the associated benefit of improved thermal integration from recuperation of the developed heat in the second $SO_2$ converter.

In a further embodiment the process plant for production of sulfuric acid further comprising an incinerator having a feedstock inlet, an oxidant inlet, an optional support fuel inlet and an outlet, in which said feedstock comprising sulfur is in fluid communication with said feedstock inlet, an oxidant, such as air, heated air or an oxygen rich gas, is in fluid communication with said oxidant inlet, an optional support fuel feed is in fluid communication with said support fuel inlet and the incinerator outlet is in fluid communication with said process gas inlet, with the associated benefit of a wider range of feedstocks comprising sulfur being compatible with such a process plant including an incinerator, including reduced sulfur such as $H_2S$ and elemental sulfur as well as spent sulfuric acid comprising impurities.

A further aspect of the invention relates to a process for production of sulfuric acid comprising the steps of
directing a process gas, comprising $SO_2$ and $O_2$ to contact a material catalytically active in oxidation of $SO_2$ to $SO_3$, providing an oxidized process gas,
optionally adding water for hydration of $SO_3$ to $H_2SO_4$ to said process gas or oxidized process gas and directing it to a first condenser,
from said first condenser withdrawing condensed $H_2SO_4$ and a partially desulfurized gas, having a temperature of at least 150° C., 160° C. or 180° C. to 190° C., 200° C. or 220° C.,
combining said partially desulfurized gas with a recycled hot intermediate process gas, providing an intermediate process gas,
heating said intermediate process gas by heat exchange in one or more heat exchangers, providing a hot intermediate process gas
withdrawing an amount of said hot intermediate process gas as recycled hot intermediate process gas,
directing said hot intermediate process gas to a second material catalytically active in oxidation of $SO_2$ to $SO_3$, and providing a fully oxidized process gas,
optionally adding water for hydration of $SO_3$ to $H_2SO_4$ to said hot intermediate process gas or fully oxidized process gas, directing it to a second condenser,
from said second condenser withdrawing condensed $H_2SO_4$ and a desulfurized gas with the associated benefit of such a process being more thermally efficient and having lower equipment cost, compared to an equivalent process in which the gas withdrawn from the first condenser has a lower temperature.

In a further embodiment the temperature of the process gas entering the first $SO_2$ converter is from 360° C., 370° C. or 380° C. to 400° C., 410° C. or 420° C., with the associated benefit of such process conditions being highly effective in conversion of $SO_2$ to $SO_3$.

In a further embodiment the temperature of the process gas entering the first condenser is from 240° C., 260° C. or 280° C. to 290° C., 300° C. or 310° C., with the associated benefit of such process conditions reducing the loss of energy required for cooling and reheating the partially converted process gas.

In a further embodiment said material catalytically active in oxidation of $SO_2$ to $SO_3$ comprises at least one element taken from the group consisting of alkali-vanadium, platinum, caesium, ruthenium oxide, and activated carbon, with the associated benefit of such catalytically active materials being highly selective and robust for oxidation of $SO_2$ to $SO_3$.

In a further embodiment the process gas comprises 1-10 mole % $SO_2$, with the associated benefit of such a process gas having an appropriate release of heat for maintaining the heat balance of the plant.

In a further embodiment the process for production of sulfuric acid comprises the additional step of incinerating a feedstock rich in sulfur in the presence of an oxidant to form said process gas, with the associated benefit of such a process being able to utilize a wider range of feedstocks comprising sulfur, including reduced sulfur such as $H_2S$ and elemental sulfur as well as spent sulfuric acid comprising impurities.

In a further embodiment the temperature of the hot recycled process gas is from 360° C., 370° C. or 380° C. to 400° C., 410° C. or 420° C. with the associated benefit of a gas with such a temperature being well suited for re-heating the partially desulfurized gas and at the same time being suitable for catalytical oxidation of $SO_2$ to $SO_3$.

In a further embodiment the ratio between the flow of partially desulfurized gas and a recycled hot intermediate process gas is from 12:1 to 4:1, with the associated benefit of such a ratio being a good balance between the ability to mix the flows and the ability to raise the temperature of the reheated partially desulfurized gas to a level safely above the sulfuric acid dew point.

The processes for converting a sulfur based feedstock into sulfuric acid includes the so-called wet sulfuric acid process, in which a sulfur based feedstock is transformed into $SO_2$, which is catalytically oxidized $SO_3$ and which is hydrated to form $H_2SO_4$ which is condensed to make the desired acid product.

Thermal management of a plant for production of sulfuric acid is complex. The oxidation of $SO_2$ to $SO_3$ is an exothermal process, which in the presence of a catalyst requires an activation temperature above 360° C. The $SO_2$ conversion efficiency is usually limited by chemical equilibrium, which is shifted towards $SO_2$ at high temperature. Therefore the partially converted process gas temperature is decreased by interbed heat exchange to gain favorable equilibrium conditions, still keeping the temperature above the catalyst activation temperature.

Since condensed concentrated $H_2SO_4$ is highly corrosive the converted process gas temperature must be above the sulfuric acid dew point, to avoid unintended condensation of $H_2SO_4$. Sections of the plant where condensation is intended to take place are required to be corrosion resistant, i.e. made from expensive equipment with lined surfaces, or made from glass, at least until condensing conditions are overcome, e.g. by dilution with air or heating of the process gas above the dew point temperature.

Furthermore the condensation of sulfuric acid is very complex, with a high tendency to formation of aerosols if the condensation process is not controlled by applying the proper cooling rate of the process gas. The aerosols can be difficult to re-evaporate. Furthermore the process gas leaving sulfuric acid condensers in other configurations may be prone to undesired condensation immediately downstream the condenser if cold surfaces are present, often with corrosion effects.

Traditionally the design criteria for a wet sulfuric acid plant have involved minimizing the outlet temperature from the $SO_2$ converter, resulting in maximum conversion of $SO_2$ to $SO_3$ in the converter. Similarly the outlet temperature of the condenser has been minimized, to ensure complete condensation of sulfuric acid. However, with the introduction of dual condensation processes, the range of operational parameters have been expanded, and non-trivial possibilities for improving process operation have been identified.

With a second $SO_2$ converter and a second condenser, it is acceptable to have a higher level of $SO_2$ out of the first converter and a higher level of $H_2SO_4$ out of the first condenser, as long as these higher levels may be mitigated in the second converter and second condenser. The very nature of condensation requires cooling of the process gas, which is thermally inefficient as such in dual condensation layout, since the process gas for the second stage is required to be reheated, in order to achieve the catalyst activation temperature for the conversion of $SO_2$ to $SO_3$.

Therefore a process layout in which the cooling of the process gas in the condensation step is limited and the need for reheating is similarly limited increases the thermal efficiency of the process. As long as the drawbacks from increased sulfuric acid vapor and $SO_2$ concentration in the process gas are minor, it will be beneficial to operate the first conversion and first condensation step in a less optimal manner.

FIGURES

Figure 1:
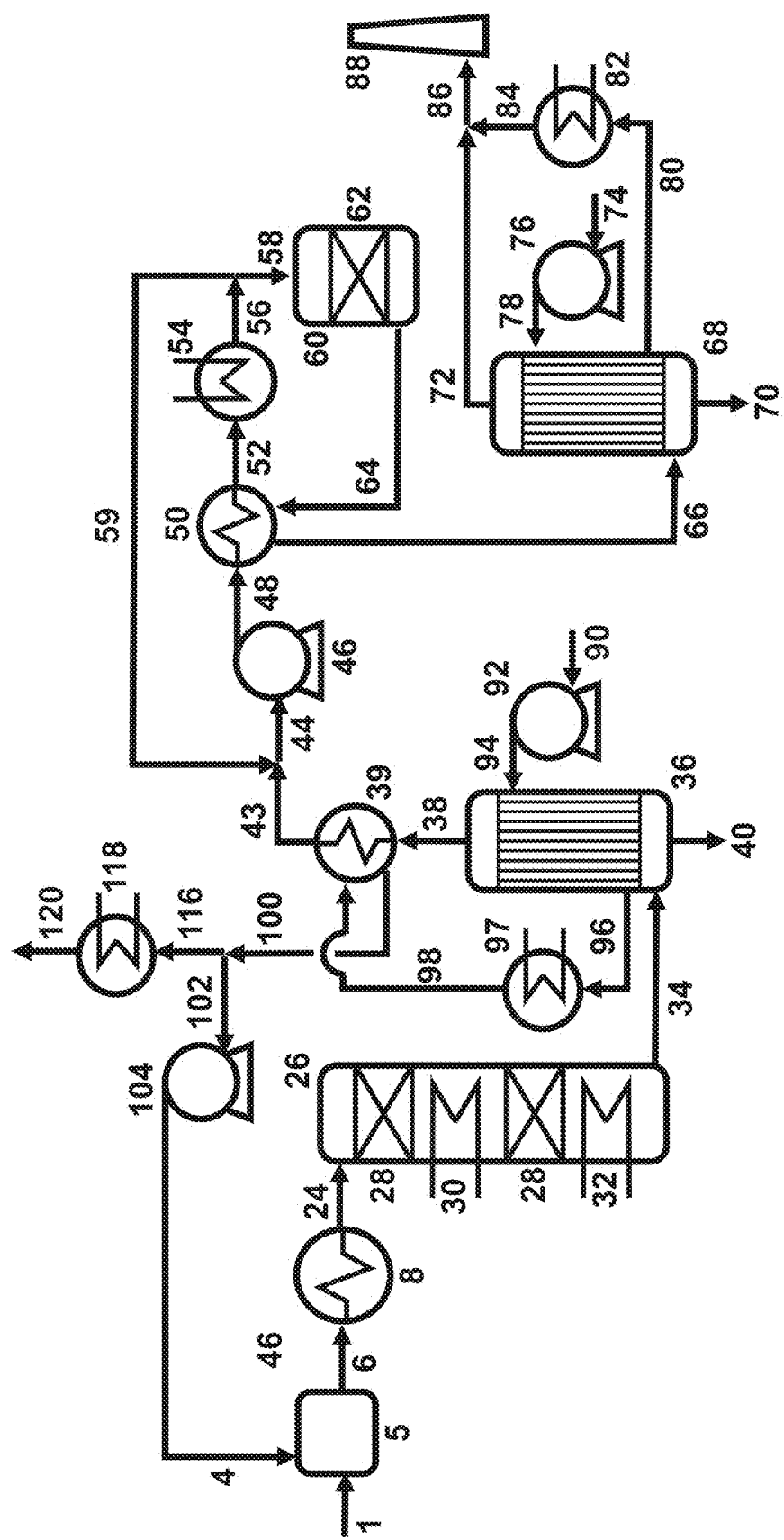
FIG. 1 shows a process layout according to the prior art, with either acid gas ($H_2S$) or elemental sulfur as feedstock.

ELEMENTS USED IN THE FIGURES (1) Sulfur containing feedstock
(2) Compressed atomizing air
(3) Support fuel
(4) Combustion air
(5) Combustion chamber
(6) Hot incinerated gas
(8) Heat exchanger
(12) Process gas cooler
(16) Filtration device
(17) Solids line
(18) Solids-free process gas
(20) Diluted process gas
(22) SCR catalytic reactor
(24) Hot $SO_2$ containing process gas
(26) First $SO_2$ converter
(28) Catalyst layer
(30) Interbed cooler(s)
(32) Partially converted process gas cooler
(34) Cooled $SO_3$ containing process gas
(36) First sulfuric acid condenser
(38) Partially desulfurized gas
(39) First process gas heater
(40) Liquid outlet of the first condenser
(41) Mixing point
(43) Reheated partially desulfurized gas
(44) Secondary process gas
(46) Process gas blower
(48) Pressurized process gas
(50) Second process gas reheater
(52) Pre-heated process gas
(54) Third process gas reheater
(58) Hot partly desulfurized process gas
(59) Recycled hot process gas
(60) Second $SO_2$ converter
(62) Catalyst layer
(64) Fully converted process gas
(66) Cooled process gas
(68) Second sulfuric acid condenser
(70) Liquid outlet of the second condenser
(72) Fully converted desulfurized process gas
(74) Cooling air for the second sulfuric acid condenser
(76) Second cooling air blower
(78) Pressurized cooling air for second sulfuric acid condenser
(80) Hot cooling air from second condenser
(82) Stack air heat exchanger
(84) Hot air
(86) Stack gas
(88) Stack
(90) Cooling air for first sulfuric acid condenser
(92) First cooling air blower
(94) Pressurized cooling air for first sulfuric acid condenser
(96) Hot cooling air
(97) Cooling air heater
(98) Hot air to the first process gas reheater
(100) Air leaving first process gas reheater
(102) Combustor fraction of the cooling air (104) Combustion air blower
(108) Compressed dilution air
(110) Hot dilution air
(112) NH$_3$ source
(114) Dilution air mixture
(116) Excess cooling air
(118) Cooling air heat recuperator
(120) Cold cooling air In FIG. 1, an overall process layout of prior art for a so-called double conversion double condensation sulfuric acid plant is shown. A sulfur containing feedstock (1), such as an H$_2$S containing gas and/or elemental sulfur, is fed into a combustion chamber (5), where any sulfur compound is converted into SO$_2$ in the hot flame zone of the combustor. Oxygen for the oxidation of feedstock is added to the combustion chamber (5) as preheated atmospheric air (4) from the 1$^{st}$ sulfuric acid condensation step. If support fuel is needed, it is also added to the combustion chamber (5). The hot incinerated gas (6) leaves the combustion chamber (5) at 800-1,200° C. and it is cooled to 380-420° C. in heat exchanger (8) forming a hot SO$_2$ containing process gas (24). Typically this heat exchanger is a so-called waste heat boiler, producing saturated high pressure steam from the duty transferred from the hot incinerated gas (6). The hot SO$_2$ containing process gas (24) enters the first SO$_2$ converter (26), in which one or more layers of catalyst (28), suitable for the oxidation of SO$_2$ to SO$_3$, are installed. The number of layers of catalyst (28) is typically between 1 and 3, depending on the desired SO$_2$ conversion efficiency. The oxidation of SO$_2$ is an exothermal reaction, which increases the temperature of the catalyst and process gas and in order to provide beneficial thermodynamic conditions for the SO$_2$ conversion, the heat of reaction is typically removed in one or more interbed cooler(s) (30), installed between the catalyst layers. Usually high pressure steam is used to cool the process gas to the optimal temperature for the next catalyst layer. After the final catalyst layer in the first SO$_2$ converter (26), typically 95% of the SO$_2$ has been oxidized and the partially converted process gas is cooled to around 280-300° C. in the partially converted process gas cooler (32), producing high pressure saturated steam. The cooled SO$_3$ containing process gas (34) is directed to the first sulfuric acid condenser (36) in which the process gas is cooled to around 100° C. by heat exchange with atmospheric air (94). The SO$_3$ reacts with water in the gas phase to form H$_2$SO$_4$ and upon cooling the H$_2$SO$_4$ is condensed from the gas phase and is withdrawn from the liquid outlet of the first condenser (40) at the bottom of the first sulfuric acid condenser. The cooled partially desulfurized gas (38) leaving the condenser is practically free of sulfuric acid vapor, but a small amount of sulfuric acid aerosol in unavoidable. To evaporate this sulfuric acid aerosol, the partially desulfurized gas (38) is directed to the first process gas reheater (39), which is made of corrosion resistant material and uses the hot air from the first sulfuric acid condenser (36) and cooling air heater (97) to bring the temperature of the reheated process gas (43) to around 180° C., i.e. above the sulfuric acid dew point temperature. To increase the secondary process gas (44) temperature to around 210° C., recycled hot process gas (59) is mixed with the reheated process gas (43) and afterwards compressed in the process gas blower (46). In the second process gas reheater (50) the pressurized process gas (48) exchanges heat with the fully converted process gas (64) from the second SO$_2$ converter (60) and the final reheating of the pre-heated process gas (52) may be carried out in the third process gas reheater (54), ensuring the optimal temperature of the process gas entering the second SO$_2$ converter (60), typically 370-410° C. A fraction of the hot process gas from the third process gas reheater (54) is recycled (59) to a position upstream the process gas blower (46). The process gas for recycle could also have been withdrawn from position (52), but would require a higher flow rate due to the lower temperature of the process gas. The process gas (58) entering the second SO$_2$ converter has low SO$_2$ and SO$_3$ concentration and thus it is possible to achieve high SO$_2$ conversion efficiency with only a single catalyst layer (62), but in principle the second SO$_2$ converter could also consist of two catalyst layers separated by an interbed cooler, just as depicted in the first SO$_2$ converter (26). The fully converted process gas (64) leaving second SO$_2$ converter is cooled in second process gas reheater (50) and the cooled process gas (66) is directed to the second sulfuric acid condenser (68), which works in the same manner as the first sulfuric acid condenser (36). The sulfuric acid withdrawn from the liquid outlet of the first condenser (40) and the liquid outlet of the second condenser (70) are mixed and cooled before sent to a sulfuric acid storage tank.

The fully converted desulfurized process gas (72) leaving the second sulfuric acid condenser at around 100° C. contains minimal amounts of SO$_2$ and sulfuric acid aerosol and can be sent to the stack (88) without further treatment.

The cooling air for the second sulfuric acid condenser (78) may be ambient air which is compressed in second cooling air blower (76) before entering the second sulfuric acid condenser (68). The hot cooling air from the second condenser (80) is heated in a stack air heat exchanger (82) to increase the temperature of hot air (84) and mixed directly with the fully converted desulfurized process gas (72) in order to ensure complete evaporation of the sulfuric acid aerosol and provide a dry stack gas (86), such that the stack (88) can be designed for dry conditions. In some cases it may not be necessary to increase the temperature of the hot cooling air from the second condenser (80) and thus the stack air heat exchanger (82) can be omitted. If the stack is designed for "wet" conditions by use of corrosion resistant materials a stack air heat exchanger (82) may alternatively be used to cool the hot cooling air, thus increasing the heat recovery of the plant.

Figure 2:
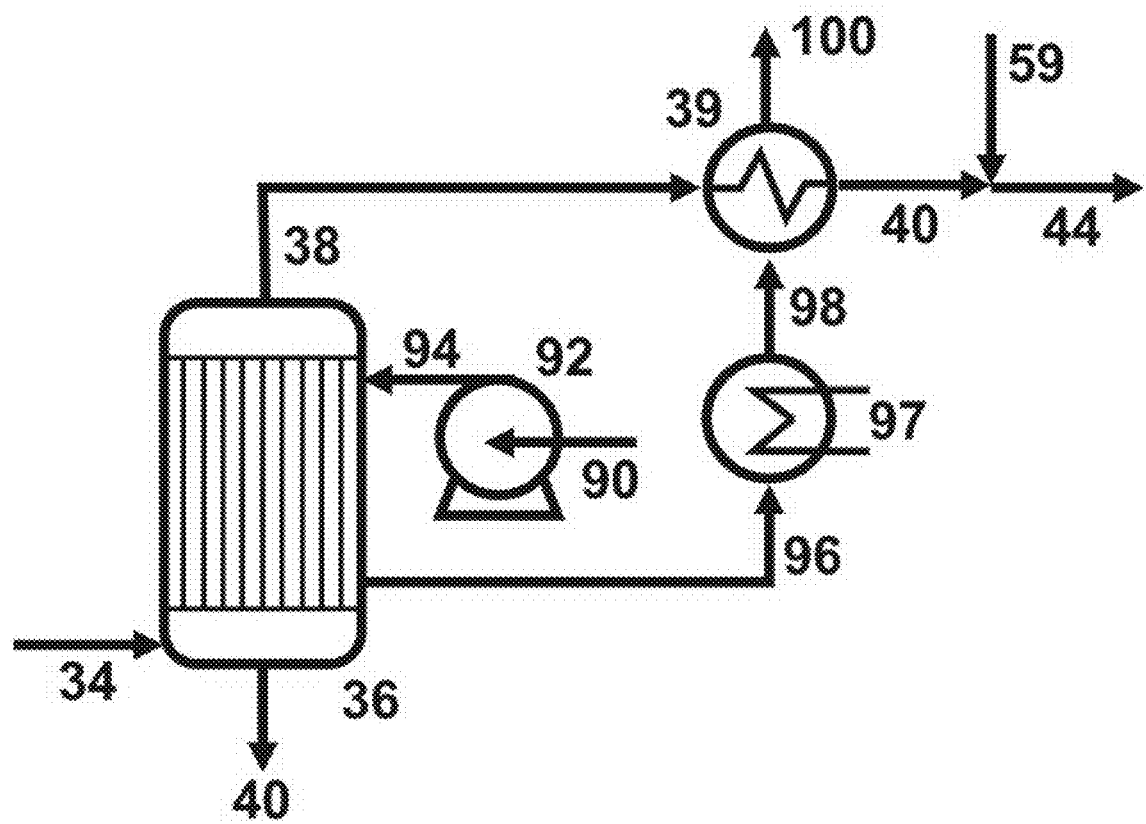
FIG. 2 shows a process layout which is a detail of the prior art.

In FIG. 2, corresponding to a detail of FIG. 1, the process layout of prior art around the first sulfuric acid condenser and first reheating of the partially desulfurized gas is shown. The cooled SO$_3$ containing process gas (34) enters at the bottom of the first sulfuric acid condenser (36), which consists of a tube bank of vertical glass tubes in which the process gas enters the tubes from the bottom. As the process gas is cooled on its way up through the tube, sulfuric acid is formed and condenses on the glass tube inner surface and/or the internal coil used for enhancement of heat transfer. By gravity the condensed sulfuric acid flows to the bottom of the tubes and is withdrawn at the liquid outlet of the first condenser (40). At the 100° C. process gas outlet temperature practically no sulfuric acid can exist in the gas phase of the partially desulfurized gas (38), but small amounts of sulfuric acid aerosol has been formed, of which the majority is captured in demisters at the top of the glass tubes. The process gas line containing the partially desulfurized gas (38) is thus considered "wet" and must be made of a material suitable to withstand the corrosive nature of the sulfuric acid. In first process gas reheater (39) the temperature of the process gas is increased to between 160° C. and 200° C., which is sufficient to ensure evaporation of the sulfuric acid aerosol and thus provide a "dry" process gas for further reheating to the 370-410° C. required for the final SO$_2$ conversion in the second SO$_2$ converter (60). First process gas reheater (39) must be constructed of sulfuric acid resistant material on the process gas side and glass is usually selected due to its very high corrosion resistance and relatively low cost.

Atmospheric air (90) is used as the cooling media in the first sulfuric acid condenser. The cooling air is compressed in first cooling air blower (92) and send to the cold end of first sulfuric acid condenser at a temperature in the typical range 20-50° C. In the first sulfuric acid condenser (36) the cooling air is heated and leaves the condenser as heated cooling air (96) at a temperature in the typical range 200-260° C., which is suitable for reheating the partially desulfurized gas (38) leaving the first sulfuric acid condenser (36) while not being too hot to exceed the design temperature for the construction material of the first process gas reheater (39).

The heated cooling air (96) may pass an optional cooling air heater (97), which increases the temperature of the hot cooling air (98) to the process gas reheater (39) to the desired 230-260° C., should the heated cooling air (96) not already have this temperature.

The cooling air leaving the first process gas reheater (100) is typically 180-220° C. and to increase heat recovery of the plant, this remaining thermal energy can be used. In FIG. 1 is shown a layout in which a combustor fraction of the cooling air (102) is compressed in combustion air blower (104) and used for combustion air (4) in the combustion chamber (5). In this way all the thermal energy of the cooling air is recovered in the plant. The cooling air flow is typically twice the amount of combustion air and thus an excess fraction of cooling air (116) must be directed via another route. If economically viable, heat can be taken out of the cooling air in a cooling air heat recuperator (118), before the cold cooling air (120) is vented. The heat from the cooling air can be used for e.g. boiler feed water preheating, demineralized water preheating, low pressure steam production and/or drying purposes.

One drawback of this process gas cooling and reheating layout is that much cooling duty is required to cool the process gas from 270-300° C. to 100° C. and reheat it from 100° C. to 180° C. again. This requires high cooling air flow and large heat exchanger areas, as gas/gas heat exchangers have relatively low heat transfer coefficients. Furthermore during off-set conditions, such as low load operation (both with regard to flow and/or sulfuric acid production) it can be difficult to maintain a high temperature of the heated cooling air (96) leaving the first sulfuric acid condenser and thus it is necessary to add a cooling air heater (97), increasing cost and adding complexity to the plant. Electric heaters, steam and hot oil heaters are applicable for the cooling air heating. Also during start-ups and shut-downs it can be difficult to control the temperature of the air to the first reheater (39), due to heating of equipment and due to chemical variations from variations in the amount of sulfur, and thus the amount of energy released may vary in such situations.

Figure 3:
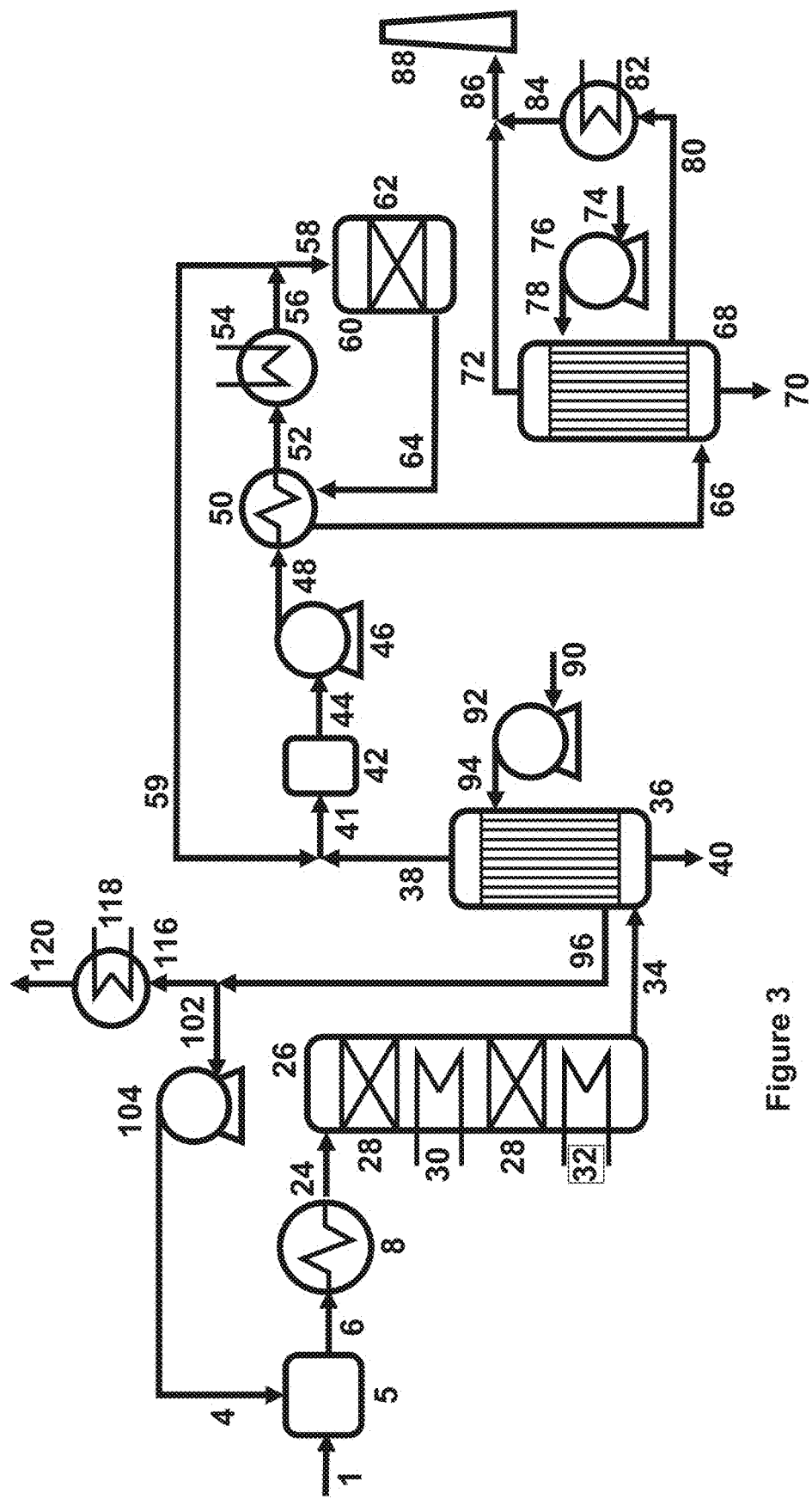
FIG. 3 shows a process layout of the present disclosure, with either acid gas ($H_2S$) or elemental sulfur as feed stockfeedstock.
Figure 4:
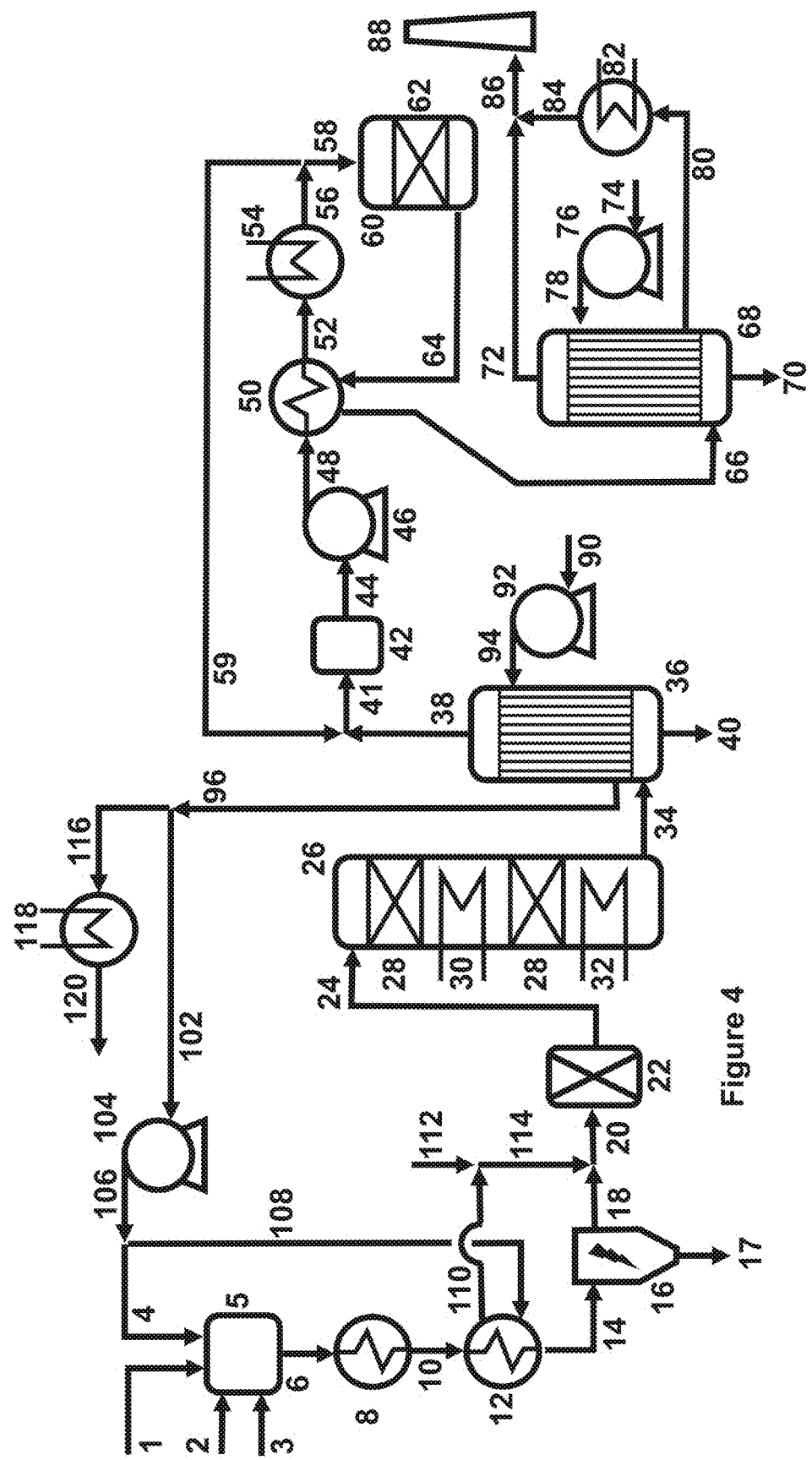
FIG. 4 shows a process layout of the present disclosure, with so-called spent sulfuric acid as feedstock.

In FIGS. 3 and 4 improved layouts are proposed, which mitigates some drawbacks of the prior layout as described above.

In FIG. 3, an example of an overall process layout of prior art for a so-called double conversion double condensation sulfuric acid plant is shown. The majority of the process layout correspond to the layout shown in FIG. 1 in which a sulfur containing feedstock (1), such as an H$_2$S containing gas and/or elemental sulfur, is fed into a combustion chamber (5), where any sulfur compound is converted into SO$_2$ in the hot flame zone of the combustor. Oxygen for the oxidation of feedstock is added to the combustion chamber (5) as preheated atmospheric air (4) from the 1$^{st}$ sulfuric acid condensation step. If support fuel is needed, it is also added to the combustion chamber (5). The hot incinerated gas (6) leaves the combustion chamber (5) at 800-1,200° C. and it is cooled to 380-420° C. in heat exchanger (8) forming a hot SO$_2$ containing process gas (24). Typically this heat exchanger is a so-called waste heat boiler, producing saturated high pressure steam from the duty transferred from the hot sulfuric acid gas (6). The hot SO$_2$ containing process gas (24) enters the first SO$_2$ converter (26), in which one or more layers of catalyst (28), suitable for the oxidation of SO$_2$ to SO$_3$, are installed. The number of layers of catalyst (28) is typically between 1 and 3, depending on the desired SO$_2$ conversion efficiency. The oxidation of SO$_2$ is an exothermal reaction, which increases the temperature of the catalyst and process gas and in order to provide beneficial thermodynamic conditions for the SO$_2$ conversion, the heat of reaction is typically removed in one or more interbed cooler(s) (30), installed between the catalyst layers. Usually high pressure steam is used to cool the process gas to the optimal temperature for the next catalyst layer. After the final catalyst layer in the first SO$_2$ converter (26), typically 95% of the SO$_2$ has been oxidized and the partially converted process gas is cooled to around 270-300° C. in the partially converted process gas cooler (32), producing high pressure saturated steam.

The cooled SO$_3$ containing process gas (34) is directed to the first sulfuric acid condenser (36) which is similar to the one described in the FIG. 1, but the main difference is that the partially desulfurized gas leaves the first sulfuric acid condenser at 180° C., thus significantly reduces the cooling duty in the first sulfuric acid condenser and eliminates the first process gas reheating step. The partially desulfurized gas (38) having a temperature in the range 140-190° C. is combined with recycled hot process gas (59) to evaporate the small amounts of sulfuric acid aerosol in the partially desulfurized gas (38) and provide a dry gas for the downstream process gas blower (46). Between the mixing point (41) and process gas blower, a gas mixer (42) comprising elements for enhancing the mixing, such as impingement plates or packing elements can be installed to ensure that the two gases (38 and 59) are sufficiently mixed to ensure that aerosol evaporation is completed in the secondary process gas (44) before the process gas blower (46)

The flow of heated cooling air (96) from the first sulfuric acid condenser (36) is reduced compared to prior art, but there is still surplus compared to the need for combustion air (4) and still only a fraction (but a larger fraction) of the hot cooling air is directed to the combustion air blower (104). The smaller fraction of excess cooling air (116) can be used to heating purposes as described in the prior art.

To increase the secondary process gas (44) temperature to around 210° C., recycled hot process gas (59) is mixed with the partially desulfurized process gas (38) and afterwards compressed in the process gas blower (46). In the second process gas reheater (50) the pressurized process gas (48) exchanges heat with the fully converted process gas (64) from the second SO$_2$ converter (60) and the final reheating of the preheated process gas (52) may be carried out in the third process gas reheater (54), ensuring the optimal temperature of the process gas entering the second SO$_2$ converter (60), typically 370-410° C. A fraction of the hot process gas is recycled (59) to a position upstream the process gas blower (46). The process gas for recycle could also have been withdrawn from position (52), but would require a higher flow rate due to the lower temperature of the process gas.

The process gas (58) entering the second $SO_2$ converter has low $SO_2$ and $SO_3$ concentration and thus it is possible to achieve high $SO_2$ conversion efficiency with only a single catalyst layer (62), but in principle the second $SO_2$ converter could also consist of two catalyst layers separated by an interbed cooler, just as depicted in the first $SO_2$ converter (26). The fully converted process gas (64) leaving second $SO_2$ converter is cooled in second process gas reheater (50) and the cooled process gas (66) is directed to the second sulfuric acid condenser (68), which works in the same manner as the first sulfuric acid condenser (36). The sulfuric acid withdrawn from the liquid outlet of the first condenser (40) and the liquid outlet of the second condenser (70) are mixed and cooled before sent to a sulfuric acid storage tank.

The fully converted desulfurized process gas (72) leaving the second sulfuric acid condenser at around 100° C. contains minimal amounts of $SO_2$ and sulfuric acid aerosol and can be sent to the stack (88) without further treatment.

The cooling air for the second sulfuric acid condenser (78) may be ambient air which is compressed in second cooling air blower (76) before entering the second sulfuric acid condenser (68). The hot cooling air from second condenser (80) is heated in a stack air heat exchanger (82) to increase the temperature of hot air (84) and mixed directly with the fully converted desulfurized process gas (72) in order to ensure complete evaporation of the sulfuric acid aerosol and provide a dry stack gas (86), such that the stack (88) can be designed for dry conditions. In some cases it may not be necessary to increase the temperature of the hot cooling air from second condenser (80) and thus the stack air heat exchanger (82) can be omitted. If the stack is designed for "wet" conditions by use of corrosion resistant materials a stack air heat exchanger (82) may alternatively be used to cool the hot cooling air, thus increasing the heat recovery of the plant.

In an alternative embodiment not shown the heat exchange medium used for cooling the condenser may be process gas instead of atmospheric air. This has the benefit of providing at least partial pre-heating of the process gas prior to reaction, but it may require a more careful design of the condenser, with respect to gas leakage.

In a further alternative embodiment not shown, the oxidant directed to the incinerator may be pure oxygen or another oxygen enriched gas instead of atmospheric air. This has the benefit of higher combustion efficiency and lower volumes of process gas, but the drawback may be that the cost of oxygen is too high and that the reduced volume also means a reduced thermal dilution of the released heat.

In FIG. 4, an alternative double conversion double condensation process layout is shown for regeneration of so-called spent sulfuric acid from e.g. an alkylation unit. It is primarily in the front end of the sulfuric acid plant that the layout differs from the process layout as shown in FIG. 3.

Spend sulfuric acid from an alkylation unit is roughly 90% w/w $H_2SO_4$, 5% w/w $H_2O$ and 5% w/w hydrocarbons, which must be regenerated to at least 98% w/w $H_2SO_4$ before recycled back to the alkylation unit. The process of regenerating the spent acid is to combust the hydrocarbons at high temperature (>1000° C.) at which the hydrocarbons are oxidized to $CO_2$ and $H_2O$. At that temperature, sulfuric acid is decomposed into $SO_2$, $O_2$ and $H_2O$. The $SO_2$ must then be oxidized to $SO_3$, react with water to form $H_2SO_4$ and condensed to produce the desired sulfuric acid product.

The spent sulfuric acid, which is the sulfur containing feedstock (1) in this example, is atomized into the flame of the combustion chamber (5) by means of compressed atomizing air (2). Support fuel (3) is needed to sustain a high combustion temperature and to reduce support fuel consumption, hot combustion air (4) is used as the $O_2$ source. If higher acid production is desired, other sulfur containing feeds can be added, e.g. $H_2S$ gas and/or elemental sulfur. The hot process gas from the combustion chamber is cooled to 450-550° C. in heat exchanger (8) which may be a waste heat boiler, producing high pressure saturated steam, and further cooled in process gas cooler (12) to a temperature in the range 380-420° C. As the spent acid feed contains (minor) amounts of dissolved metals, the metals will form oxides and sulfates during combustion and the process gas (6, 10 and 14) will contain minor amounts of solids, which are removed in a filtration device (16). The filter can be either an electrostatic precipitator or a ceramic filter. The solids are separated from the process gas and are withdrawn from the filter in line (17). The solids-free process gas (18) is combined with a hot air stream (114), optionally containing $NH_3$. Compressed cooling air (108) from the first sulfuric acid condenser (36) is heated from the 240-280° C. at the outlet of the combustion air blower (104) to 380-420° C. in process gas cooler (12). The hot dilution air (110) is optionally mixed with an $NH_3$ source (112), such as anhydrous $NH_3$, aqueous $NH_3$, or urea, before the dilution air (114) optionally comprising $NH_3$ is combined with the $SO_2$ containing process gas. The combustion chamber (5) is operated with moderate excess of $O_2$, to minimize the process gas flow and thus the volume and cost of combustion chamber (5), heat exchanger (8) (waste heat boiler) and filtration device (16). Therefore the $SO_2$ laden process gas (18) does not contain sufficient $O_2$ for the complete oxidation of the $SO_2$ to $SO_3$ in the first $SO_2$ converter (26) and thus the dilution air (114) is required. Alternatively the excess of $O_2$ in the combustion chamber (5) could be higher, at the expense of increased process gas volumes and equipment costs.

The diluted process gas (20) optionally passes through a SCR catalytic reactor (22), in which NO and $NO_2$ in the process gas reacts with the $NH_3$ (112) supplied via the dilution air (114) to form harmless $N_2$ and $H_2O$, in the so-called selective catalytic reduction (SCR) process.

The process gas then enters the first $SO_2$ converter (26) in which the $SO_2$ is catalytically oxidized to $SO_3$ and the first sulfuric acid condensation step, process gas reheat, second $SO_2$ oxidation step and second sulfuric acid condensation step is as described previously—see also FIG. 3.

An alternative layout, when a SCR reactor is required, is to split the hot dilution air (110) into two fractions: one $NH_3$ containing stream (114) as shown in FIG. 4 and a $NH_3$-free stream that is mixed with stream 24 just upstream the $SO_2$ converter (26). By using the minimum carrier air for $NH_3$, the major fraction of the dilution air (110) is bypassed the SCR catalytic reactor (22), thus minimizing the size of the reactor.

In a further embodiment not illustrated, an equivalent SCR system comprising an SCR reactor and an $NH_3$ containing stream could be added to the process layout shown in FIG. 3.

Example 1: First Sulfuric Acid Condenser and Process Gas Reheating for a 900 MTPD Sulfuric Acid Plant In this example process calculations for a 900 MTPD (Metric Tons Per Day) have been calculated for two layouts of the double conversion double condensation process as described above. In the prior art the process gas in the first sulfuric acid condenser is cooled from 290° C. to 100° C. and reheated to 180° C. as sketched in FIG. 1. In the proposed new layout the same process gas is cooled from 290° C. to 180° C. as depicted in FIG. 3.

The flow and composition of the process gas entering the first sulfuric acid condenser are similar, as the upstream processes are similar for the two layouts. The plant layout downstream first reheating section (i.e. from stream 44 and to the stack (88) is also similar for the two layouts. Due to the 80° C. increase in temperature the process gas composition in stream 38 has a slightly higher concentration of $H_2SO_4$.

In Table 1, the effect of size and duty of the heat exchangers (36 and 39) are compared, for this $H_2SO_4$ plant and it is seen that the total heat exchange duty is reduced from 20.9 Gcal/h to 16.0 Gcal/h, i.e. a 23% decrease. The decreased duty to be transferred combined with larger temperature differences between the heat exchange medias result in an almost 40% decrease in the required heat exchange area.

The lower duty required in the first sulfuric acid condenser also result in a lower cooling air flow (stream 90) and thus a significantly lower power consumption in cooling air blower (92).

TABLE 1

| Description | Prior layout | New layout |
|---|---|---|
| Duty in 1$^{st}$ sulfuric acid condenser (36) | 18.4 Gcal/h | 16.0 Gcal/h |
| Duty in 1$^{st}$ process gas re-heater (39) | 2.5 Gcal/h | N/A |
| Heat exchange area (36) + (39) | 12,000 m$^2$ | 7,300 m$^2$ |
| Power in 1$^{st}$ cooling air blower (92) | 1,150 kW | 860 kW |

Example 2. Sulfuric Acid Concentration in Process Gas Leaving First Sulfuric Acid Condenser In this example the effect of increasing the temperature of the process gas (38) leaving the first sulfuric acid condenser (36) is calculated. At the process gas outlet of the first sulfuric acid condenser, a demister is installed and it can be assumed that the process gas leaving the condenser is in thermodynamic equilibrium with the sulfuric acid detained in the demister filament.

In Table 2, the vapor concentration of $H_2SO_4$ in the process gas (38) leaving the first sulfuric acid condenser (36) is shown as a function of process gas temperature, at a process gas pressure of 1.013 bar. The process gas entering the first sulfuric acid condenser contains 6 vol % $SO_3$ (unhydrated) and 10 vol % $H_2O$ (unhydrated). The major part of the sulfuric acid is condensed and withdrawn in the bottom of the sulfuric acid condenser. The vapor phase sulfuric acid leaving with the process gas will be condensed in the second sulfuric acid condenser (68).

As seen in the table, the $H_2SO_4$ vapor concentration increases with increasing temperature, from practically zero concentration at 100° C. to as much as 0.9 vol % at 220° C. At 100° C. practically 100% of the acid is withdrawn as condensed product, which decreases to 86.7% at 220° C.

In principle the first sulfuric acid condenser could operate at 220° C., further reducing the duty in first sulfuric acid condenser and need for process gas reheating. But the large fraction of $H_2SO_4$ vapor leaving the first sulfuric acid condenser will negatively influence the thermodynamic equilibrium of reaction $SO_2+0.5\ O_2\leftrightarrow SO_3$, taking place in the second $SO_2$ converter, as $H_2SO_4$ decomposes to $SO_3$ and $H_2O$ at the high temperature in the $SO_2$ converter. The result will be a lower $SO_2$ conversion efficiency and/or a larger catalyst volume required.

Also a higher $H_2SO_4$ concentration in the process gas to the second sulfuric acid condenser will increase the size and duty of this unit, reducing the cost savings gained for the first sulfuric acid condenser.

The 160-190° C. temperature range of the process gas leaving the first sulfuric acid condenser represent the optimal trade-of between capital and operation cost and $SO_2$ conversion efficiency A further benefit of the higher process gas outlet temperature is that more water vapor is stripped from the demister acid and carried away with the process gas, slightly increasing the concentration of the condensed product acid.

TABLE 2

| | | Temperature of the partially desulfurized gas | | | | | | |
|---|---|---|---|---|---|---|---|---|
| | ° C. | 100 | 120 | 140 | 160 | 180 | 200 | 220 |
| $H_2SO_4$ vapor concentration | vol % | 0.00 | 0.00 | 0.01 | 0.03 | 0.12 | 0.37 | 0.90 |
| Fraction of $H_2SO_4$ removed as liquid | % | 100 | 100 | 99.1 | 99.5 | 98.2 | 94.6 | 86.7 |

The invention claimed is:

1. A process plant for production of sulfuric acid from a process gas comprising $SO_2$, comprising a process gas inlet, a first $SO_2$ converter having an inlet and an outlet, a first condenser having a gas inlet, a gas outlet and a liquid outlet, a gas mixing device having a first inlet, a second inlet and an outlet, a heat exchanger having an inlet and an outlet, a process gas heater having an inlet and an outlet, a second $SO_2$ converter having an inlet and an outlet, a second condenser having a gas inlet, a gas outlet and a liquid outlet, one or more means for cooling and storage of sulfuric acid and a purified process gas outlet, in which said process gas inlet is connected to the inlet of the first $SO_2$ converter, the outlet of the first $SO_2$ converter is connected to the gas inlet of the first condenser, the liquid outlet of the first condenser is connected to one of said means for cooling and storage of sulfuric acid, the gas outlet of said first condenser is connected to the first inlet of a mixing device, the outlet of said mixing device is connected to the inlet of the heat exchanger, the outlet of the heat exchanger is connected to inlet of the process gas heater, the outlet of said process gas heater is connected to the inlet to said second $SO_2$ converter and the second inlet of said gas mixing device, the outlet of the second $SO_2$ converter is connected to the gas inlet of the second condenser, the liquid outlet of the second condenser is connected to one of said means for cooling and storage of sulfuric acid, the gas outlet of said second condenser is connected to the purified process gas outlet, wherein the first inlet of said gas mixing device being connected to the outlet of said first condenser, without intermediate heat exchange, and wherein the heat exchanger is in thermal communication with the outlet of the second $SO_2$ converter.

2. A process plant according to claim 1 in which said mixing device comprises one or more elements for enhancing mixing.

3. A process plant according to claim 1 in which one or both of said first and second condenser comprises a cooling medium enclosure, having a cooling medium inlet and a cooling medium outlet.

4. A process plant according to claim 3, in which said cooling medium enclosure is a pressure shell, and in which said condenser comprises a number of tubes made from corrosion resistant material.

5. A process plant according to claim 3, in which said cooling medium enclosure comprises a number of tubes made from corrosion resistant materials and in which said condenser comprises a shell made from corrosion resistant materials.

6. A process plant for production of sulfuric acid from a feedstock comprising sulfur in any oxidation state according to claim 1, further comprising an incinerator having a feedstock inlet, an oxidant inlet, an optional support fuel inlet and an outlet, in which said feedstock comprising sulfur is connected to said feedstock inlet, an oxidant, is connected to said oxidant inlet, an optional support fuel feed is connected to said support fuel inlet and the incinerator outlet is connected to said process gas inlet.

7. A process plant according to claim 1, wherein said mixing device mixes a partially desulfurized gas and a recycled hot intermediate process gas.

8. A process plant according to claim 1, wherein a ratio of the partially desulfurized gas to the recycled hot intermediate process gas is from 12:1 to 4:1.

* * * * *